United States Patent [19]
Rogers

[11] Patent Number: 5,377,181
[45] Date of Patent: Dec. 27, 1994

[54] SIGNAL SWITCHING SYSTEM

[75] Inventor: William P. Rogers, Collingswood, N.J.

[73] Assignee: Linear Switch Corp., Southampton, Pa.

[21] Appl. No.: 47,312

[22] Filed: Apr. 19, 1993

[51] Int. Cl.⁵ .................. H04Q 11/04; H04L 12/12
[52] U.S. Cl. ................................ 370/16; 370/58.1; 340/825.8; 340/827
[58] Field of Search .............. 370/16, 58.1, 58.2, 370/58.3, 60, 60.1, 94.1, 94.2; 340/825.01, 825.03, 826, 827, 825.8

[56] References Cited

U.S. PATENT DOCUMENTS

| | | |
|---|---|---|
| 4,064,360 | 12/1977 | Koenig . |
| 4,455,645 | 6/1984 | Mijioka et al. ............... 340/825.01 |
| 4,878,215 | 10/1989 | Rogers ........................... 370/58.1 |
| 5,041,979 | 9/1991 | Chaudhuri et al. ................ 370/16 |
| 5,072,440 | 12/1991 | Isono et al. ...................... 340/827 |
| 5,146,453 | 9/1992 | Nagler et al. ...................... 370/16 |
| 5,189,662 | 2/1993 | Kleine-Altekamp ............... 370/16 |
| 5,222,063 | 6/1993 | Foglar et al. ...................... 370/16 |

OTHER PUBLICATIONS

Article by C. Clos, entitled "A Study of Non-Blocking Switching Networks", The Bell System Technical J., Mar., 1953, pp. 406-424.

Article by M. C. Paull, entitled "Reswitching of Connection Networks", Bell System Technical J., May 1962, pp. 833-855.

C. J. Georgiou, "Parallel Interface Switching Mechanism", IBM Technical Disclosure Bulletin, vol. 27, No. 8, Jan. 1985, pp. 4690-4692.

*Primary Examiner*—Wellington Chin
*Attorney, Agent, or Firm*—William H. Eilberg

[57] ABSTRACT

A signal switching system connects a plurality of parallel inputs to a plurality of parallel outputs. The inputs pass through a parallel-to-serial converter, and the resulting serial signal passes through a switching matrix. The output of the switching matrix is converted to parallel form in a serial-to-parallel converter. A flip-flop is disposed in the line between the switching matrix and the serial-to-parallel converter. The flip-flop receives and stores the output of the switching matrix, and transfers that output to the serial-to-parallel converter. The transferring occurs only when the flip-flop changes state, which is also when the switching matrix becomes rearranged. Separate but synchronized clock pulse signals control the rearrangement of the switching matrix and the switching of the flip-flop. The flip-flop isolates the switching matrix from the serial-to-parallel converter, and prevents switching transients from entering the output stream.

20 Claims, 2 Drawing Sheets

SIGNAL SWITCHING SYSTEM

BACKGROUND OF THE INVENTION

This invention relates to the field of switching of electrical signals, especially large numbers of such signals.

In switching a large number of inputs to any of a large number of outputs, one can reduce the number of switches required through the use of multiplexers (also known as parallel-to-serial (P/S) converters) and demultiplexers (also called serial-to-parallel (S/P) converters). Examples of circuits which use multiplexers to reduce the number of cross-points include U.S. Pat. Nos. 4,064,360 and 4,878,215. The basic process explained in the cited patents includes the steps of converting a multi-signal input into a single-signal format, switching the single signal in a switching matrix, and converting the output of the switching matrix back into a multi-signal format. This specification hereby incorporates by reference the disclosures of the above-cited patents.

One can divide non-blocking matrix switching systems into two main categories. The first category includes the "unconditionally non-blocking" switches. In an unconditionally non-blocking switch, one never needs to rearrange existing circuit connections when establishing subsequent connections. In an unconditionally non-blocking switch, all existing connections remain intact, regardless of whether one adds further connections. The second category, called "rearrangeably non-blocking" includes those switches in which one may need to alter the matrix switching configuration when adding subsequent connections, in order to preserve the integrity of the connections previously made.

FIG. 1 provides an example of an unconditionally non-blocking switching system of the prior art. The system of FIG. 1 essentially corresponds to the arrangement disclosed in the above-cited patents. One or more multiplexers convert incoming parallel signals into serial form, and the circuit redirects the serial signal, as necessary, using a single-stage non-blocking crosspoint matrix switch. One or more demultiplexers then convert the switched serial signal back to parallel form. As indicated in FIG. 1, one can have any integral number N of multiplexers and demultiplexers. Regardless of the value of N, the system remains unconditionally non-blocking, so that one may establish subsequent connections without disturbing or changing existing connections.

FIG. 2 provides an example of another switching system of the prior art. In this example, the outputs of the multiplexers feed signals to a plurality of input submatrices 100, and the demultiplexers take their inputs from the outputs of a plurality of output submatrices 101. A plurality of middle submatrices 102 stand between the input and output submatrices. A paper by Charles Clos, entitled "A Study of Non-Blocking Switching Networks", appearing in *The Bell System Technical Journal*, March, 1953, showed that for signal lines having M input lines and M output lines, one can guarantee that the arrangement of FIG. 2 will provide an unconditionally non-blocking switching system if one has at least $2n-1$ middle submatrices, where $n = M^{\frac{1}{2}}$.

FIG. 3 shows an example of a rearrangeably non-blocking matrix switching system. A description of such systems appears in the paper by M. C. Paull, entitled "Reswitching of Connection Networks", appearing in *The Bell System Technical Journal*, May, 1962. Matrix switching systems of this type include input, middle, and output stages, as shown. When one needs to rearrange existing connections to make a subsequent connection, one changes the connection path through the middle matrices.

FIG. 4 shows the use of a Paull-type matrix switching system with multiplexers and demultiplexers. FIG. 4 shows only one input matrix 110, one output matrix 112, and two middle matrices 115 and 116, but one could have more matrices, in general, as shown in FIG. 3.

The Paull-type matrix system of FIG. 4 requires even fewer cross-points, for a given size of matrix, than do the arrangements of FIGS. 1 or 2. However, the arrangement of FIG. 4 has the disadvantage that noise spikes occur when rearranging a connection path through the middle matrices. These noise spikes result from differences in signal path lengths between the various switching elements, which differences cause signal propagation delays.

Noise spikes in the signal path between the multiplexer and demultiplexer are especially problematic because the demultiplexer measures the time between successive transitions to determine whether the information being transmitted is a binary "one" or a "zero". A noise spike adds transitions to the signal. Thus, the noise spikes cause false data to enter the demultiplexers, thus reducing the reliability and efficiency of the system. In general, it is far better to delay slightly the time when a received transition occurs than to introduce an erroneous pulse, since most demultiplexers are designed to accommodate slight variations in pulse width.

The present invention provides a circuit which overcomes the problem associated with the Paull-type rearrangeably non-blocking matrix switching system. The present invention makes it practical to combine the concept of multiplexing and demultiplexing with the concept of the rearrangeably non-blocking matrices described in the article by Paull. Thus, a switching system according to the present invention enjoys the dual advantages of accurate signal transmission and reduced numbers of required crosspoint switches.

SUMMARY OF THE INVENTION

The present invention includes one or more multiplexers, one or more demultiplexers, and a plurality of switching matrices disposed between the multiplexers and demultiplexers. The switching matrices include input, middle, and output matrices. Each output line of each output matrix is connected to a flip-flop disposed in the line between the output matrix and the demultiplexer. Thus, the output of the flip-flop is connected to the input of the demultiplexer.

Each flip-flop has two inputs. One input is connected to an output line from the output matrix. The other input is connected to a source of clock pulses which coincide with other clock pulses used to rearrange the signal path through the switching matrices. The clock pulses entering the flip-flop cause the output of the flip-flop to change state.

In operation, each output signal, produced by the output matrix, appears at the input of its respective flip-flop. When one seeks to rearrange the circuit paths through the switching matrices, one sends two simultaneous clock pulses, one of which directly triggers the rearrangement, and the other of which changes the state of the flip-flop. When the flip-flop changes state, its stored input (initially one of the outputs of the output switching matrix) is transferred to the output side of the flip flop, which comprises the input side of the demultiplexer. Meanwhile, as the circuit paths through the switching matrices change, the output of the switching matrix remains isolated from the demultiplexer. Thus, any circuit transients generated during the rearrangement of the matrix switches do not reach the demultiplexer. Indeed, the output of the matrix switches cannot enter the demultiplexer until another clock pulse changes the state of the flip-flop. The flip-flops thereby restrict the times during which signals from the output switching matrices can pass to the demultiplexer, and block all circuit transients produced during the switching operation.

The present invention therefore has the primary object of providing a matrix-type switching system for switching one or more of a plurality of inputs to one or more of a plurality of outputs.

The invention has the further object of providing a switching arrangement which constitutes a rearrangeably non-blocking matrix switch, wherein the circuit transients generated during rearrangement of the matrices do not affect the output of the switching device.

The invention has the further object of reducing the number of switching crosspoints required in a switching system which connects multiple inputs to multiple outputs.

The invention has the further object of increasing the reliability and potential speed of rearrangeably non-blocking signal switching systems.

The person of ordinary skill in the art will recognize other objects and advantages of the present invention, from a reading of the following brief description of the drawings, the detailed description of the invention, and the appended claims.

DETAILED DESCRIPTION OF THE INVENTION

Figure 1:
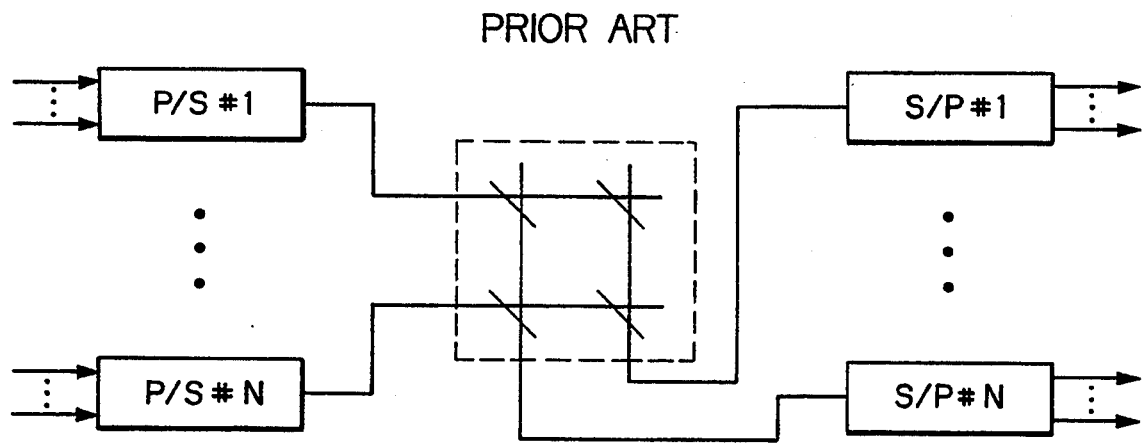
FIG. 1 provides a schematic and block diagram showing an unconditionally non-blocking switching arrangement of the prior art, wherein a single matrix switch connects a plurality of multiplexers to a plurality of demultiplexers.
Figure 2:
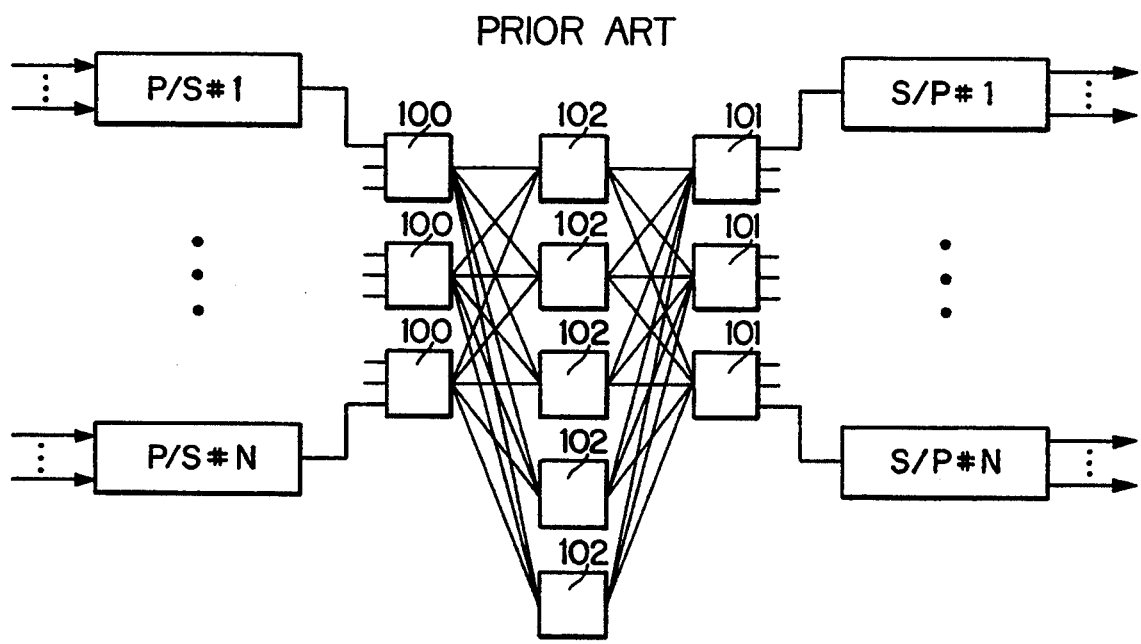
FIG. 2 provides a block diagram showing another unconditionally non-blocking switching arrangement of the prior art, wherein the matrix switching includes input, middle, and output submatrices.
Figure 3:
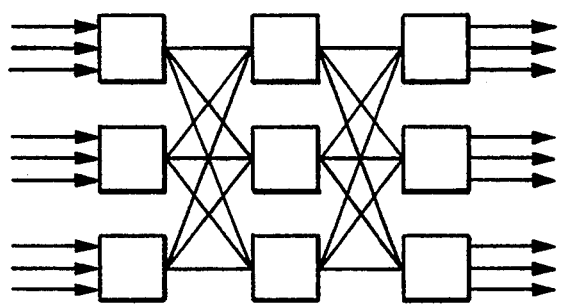
FIG. 3 provides a block diagram showing a rearrangeably non-blocking switching device of the prior art.
Figure 4:
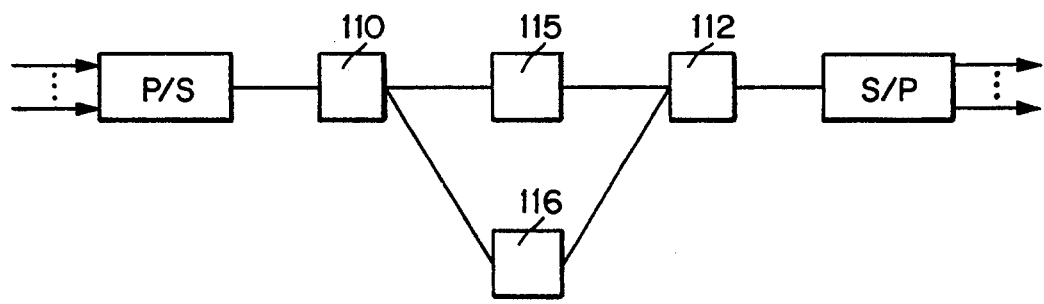
FIG. 4 provides a block diagram showing a switching device similar to that of FIG. 3, with the addition of a multiplexer and demultiplexer.
Figure 5:
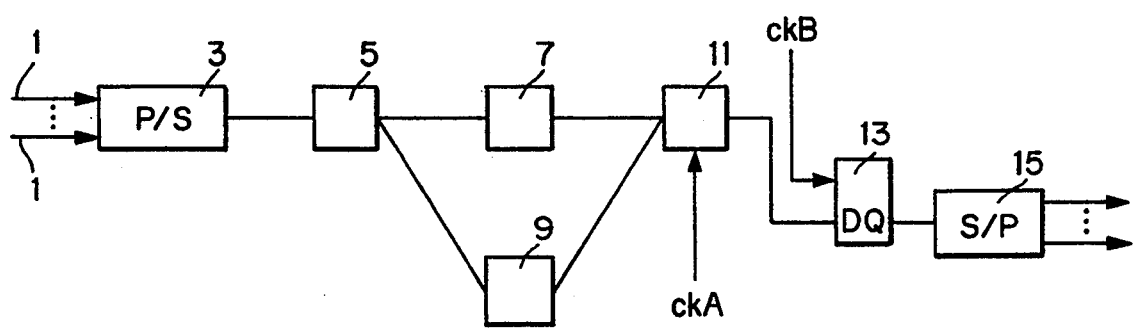
FIG. 5 provides a block diagram of the switching circuit made according to the present invention.

FIG. 5 shows the present invention. Input signals arrive on a plurality of lines 1 and enter multiplexer 3. One may also call the multiplexer a parallel-to-serial converter. The signal in serial form enters a matrix switching device which includes input matrix 5, middle matrices 7 and 9, and output matrix 11. FIG. 5 shows only four switching matrices 5, 7, 9, and 11, for the sake of clarity; in general, the matrix arrangement can resemble that of FIG. 3, which corresponds to the switching arrangements described in the article by Paull. In general, when a connection is rearranged, the input and output matrices remain the same and only a middle matrix is changed.

Flip-flop 13 is positioned in the line connecting the output of output matrix 11 to demultiplexer 15. One may also call the demultiplexer a serial-to-parallel converter. The flip-flop has an input labeled D and an output labeled Q. The flip-flop also receives a control input which causes the flip-flop to change state. In the embodiment of FIG. 5, the control signal comprises a clock signal, i.e. a series of clock pulses, designated as "ckB". Thus, the two inputs to the flip-flop comprise the signal appearing at D and the clock signal ckB.

When a clock pulse appears at the control input of the flip-flop, the flip-flop changes state, and whatever signal appearing at the input D before the clock pulse arrived is transferred to the output Q. Regardless of what signal subsequently appears at D, the value of Q remains the same until another clock pulse appears at the control input.

In operation, the signal switching system uses two clock pulse signals, designated ckA and ckB. Both clock pulse signals have the same "phase"; the pulses of ckA and ckB rise and fall at substantially the same times. Clock pulse ckA controls the switching of the matrices. Although ckA is shown connected to switching matrix 11 only, it is understood that the same signal could be connected instead to another switching matrix. In general, the circuit paths through the matrices can change only after a pulse ckA is received. The manner of rearrangement of the switching matrices forms no part of the present invention; one can use any conventional technique for performing this switching. What is important is that the switching is triggered by pulses ckA, which are synchronous with pulses ckB.

Whenever a pulse of ckA causes the rearrangement of the switching matrices, a pulse of ckB simultaneously arrives at the flip-flop and changes its state, causing the previous output of matrix 11 to become the new output of the flip-flop (and the new input to the demultiplexer). Thus, the flip-flop delivers the signal previously stored at its input D to the input of demultiplexer 15.

Meanwhile, the state of the switching matrices is changing. While the switching matrices are becoming rearranged, circuit transients may cause the value appearing at input D to fluctuate unpredictably. But the value appearing at D has no effect on the demultiplexer, because the flip-flop cannot transfer the value appearing at D until the next clock pulse of ckB arrives. Thus, the flip-flop effectively masks any switching transients that would otherwise travel from the switching matrices to the demultiplexer. Note also that the flip-flop passes the signal from D to Q before a switching transient can develop which would affect the value of D.

The flip-flop therefore constitutes both a means for storing the value of an output of the output switching matrix, and a means for transferring that value to a demultiplexer upon detection of an appropriate control pulse.

In general, one should design the pulses of ckB such that the time between pulses exceeds the time needed to rearrange the signal paths in the switching matrices. Thus, flip-flop 13 does not change state until the circuit paths have changed, and until switching transients have decayed. Because ckA and ckB have the same phase, the actual switching of the matrices occurs at times when switching transients cannot reach the demultiplexer.

Note that the clocking of the multiplexer and demultiplexer is, in general, entirely independent of ckA and ckB. Thus, the multiplexer and demultiplexer can operate at a different rate from the rate at which the circuit connections are rearranged and the rate at which signals pass through the flip-flop. In general, the multiplexer and demultiplexer operate at the same rates, though they operate independently of ckA and ckB.

FIG. 5 shows the invention in an oversimplified form. In practice, one would have a plurality of input, middle, and output matrices. Also, FIG. 5 shows only one flip-flop. In practice, one would connect a separate, similar flip-flop to the output line of each output matrix. One would clock all of these flip-flops synchronously and in parallel.

One requires a clock signal to control only one category of matrices (such as the output matrices, in the example shown). One need not specifically control the other matrices as well, since all three matrices (input, middle, and output) are necessary to complete a circuit path. Thus, FIG. 5 shows ckA controlling only the output matrix 11. However, it is possible to control more than one group of matrices, within the scope of the invention.

Instead of the flip-flop described above, one could use a D-latch type flip-flop whose output follows its input when the clock signal is high, and whose output remains in its last state when the clock input is brought low. In this case, one could bring the clock input low momentarily while the rearrangement of the switching matrix is occurring, thereby masking the transient. In other words, the output of the switching matrix is isolated from the serial-to-parallel converter while the switching matrix is being rearranged. FIG. 5 also represents the latter alternative, which should be considered within the scope of the invention. Note that in the latter alternative, the output of the switching matrix passes to the serial-to-parallel converter only while the switching matrix is not being rearranged, while in the embodiment described initially, the output of the switching matrix passes to the serial-to-parallel converter only when the switching matrix is being rearranged. Both approaches, though different, achieve the same result because the different kinds of flip-flops in both cases prevent unwanted circuit transients from passing to the output line.

The present invention can work with various types of switching matrix arrangements, and with other modifications. The invention has utility in any rearrangeably non-blocking matrix switching system. Such a system necessarily includes input, middle, and output matrices. The numbers of matrices of each category can change considerably. Indeed, the number of input matrices can differ from that of the output matrices. Also, the size of the input signal need not even match that of the output signal. The present invention can work with all such modified circuits. Such modifications should be apparent to those skilled in the art, and one should consider them within the spirit and scope of the following claims.

What is claimed is:

1. In a system for switching signals, the system being capable of switching a plurality of input signals to a plurality of output signals, the input signals being applied to inputs of a parallel-to-serial converter, the parallel-to-serial converter having an output which is connected to a switching matrix, the switching matrix having an output which is connected to a serial-to-parallel converter, the switching matrix having an input, the switching matrix comprising means for establishing and breaking circuit paths extending between the input and the output of the switching matrix, the switching matrix having a state defined by a configuration of said circuit paths, the improvement comprising a signal transferring means connected between the switching matrix and the serial-to-parallel converter, the signal transferring means including means for transferring an output signal from the switching matrix to the input of the serial-to-parallel converter, while the state of the switching matrix is being changed.

2. The improvement of claim 1, wherein the signal transferring means comprises a flip-flop connected between the switching matrix and the input of the serial-to-parallel converter.

3. The improvement of claim 2, wherein the flip-flop has first and second inputs, the first input being connected to a source of first clock pulses and the second input being connected to an output of the switching matrix.

4. The improvement of claim 3, wherein the state of the switching matrix is controlled by a second clock pulse, and wherein the first and second clock pulses are in phase with each other.

5. The improvement of claim 1, wherein the switching matrix comprises at least one input switching submatrix, at least one output switching submatrix, and a plurality of middle switching submatrices.

6. A signal switching system, comprising a parallel-to-serial converter connected to a plurality of input lines, the parallel-to-serial converter having an output connected to a switching means, the switching means having an output connected to a signal transferring means, the signal transferring means having an output connected to a serial-to-parallel converter, the serial-to-parallel converter being connected to a plurality of output lines, the apparatus further comprising means for rearranging circuit paths extending through the switching means, wherein the signal transferring means comprises means for transferring a signal from the switching means to the serial-to-parallel converter while circuit paths extending through the switching means are being rearranged.

7. The system of claim 6, wherein the signal transferring means comprises a flip-flop, the flip-flop having a first input connected to the output of the switching means, the flip-flop having a second input connected to a first source of clock pulses, the flip-flop having an output connected to the serial-to-parallel converter.

8. The system of claim 7, wherein the rearranging means includes a second source of clock pulses, wherein the clock pulses of said first and second sources are substantially in phase with each other.

9. The improvement of claim 6, wherein the switching means comprises at least one input switching matrix, at least one output switching matrix, and a plurality of middle switching matrices.

10. A system for switching signals, the system being capable of switching a plurality of input signals to a plurality of output signals, the system comprising:
   a) at least one parallel-to-serial converter connected to receive at least some of the input signals,
   b) at least one switching matrix, the switching matrix being connected to receive an output signal of the parallel-to-serial converter, the switching matrix including means for rearranging a circuit path extending through the switching matrix, c) the switching matrix having an output which is connected to a signal transferring means, the signal transferring means having an output connected to an input of a serial-to-parallel converter, wherein the signal transferring means comprises means for passing signals from the switching matrix to the input of the serial-to-parallel converter only while the rearranging means is not rearranging the circuit path extending through the switching matrix.

11. The system of claim 10, wherein the signal transferring means comprises at least one flip-flop connected between the switching matrix and the input of the serial-to-parallel converter.

12. The system of claim 11, wherein the flip-flop has first and second inputs, the first input being connected to a first source of clock pulses and the second input being connected to an output of the switching matrix.

13. The system of claim 12, wherein the switching matrix has a state which is controlled by a second source of clock pulses, and wherein the clock pulses of the first and second sources are in phase with each other.

14. In a method of switching a plurality of input signals to a plurality of output signals, the method including the steps of converting a plurality of parallel input signals into a serial signal, passing said serial signal through a switching matrix, the switching matrix having an output comprising a serial signal, and converting the output of the switching matrix, in a serial-to-parallel converter, into a plurality of parallel output signals, the improvement comprising the steps of periodically rearranging a circuit path extending through the switching matrix, and transferring the output of the switching matrix to the serial-to-parallel converter while a circuit path extending through the switching matrix is being rearranged, wherein the rearranging and transferring steps are performed synchronously.

15. The improvement of claim 14, wherein the transferring step comprises the steps of passing the output of the switching matrix to an input of a flip-flop disposed between the switching matrix and the serial-to-parallel converter, and changing the state of the flip-flop when the circuit path extending through the switching matrix is being rearranged, wherein the state-changing step is performed synchronously with the rearranging step.

16. A method of switching a plurality of parallel input signals to a plurality of parallel output signals, the method comprising the steps of:

a) converting the parallel input signals into a serial signal, b) passing the serial signal through a switching matrix, the switching matrix having a serial output, c) converting the output of the switching matrix into a parallel signal by passing said output into a serial-to-parallel converter, d) periodically rearranging a circuit path extending through the switching matrix, while transferring the output of the switching matrix to the serial-to-parallel converter only while the circuit path extending through the switching matrix is being rearranged.

17. The method of claim 16, wherein the transferring step comprises the step of directing the output of the switching matrix into a flip-flop disposed between the switching matrix and the serial-to-parallel converter, the flip-flop having an output connected to the serial-to-parallel converter, and periodically changing the state of the flip-flop so that the input becomes transferred to the output.

18. The method of claim 17, wherein the steps of periodically rearranging a circuit path extending through the switching matrix and periodically changing the state of the flip-flop comprise the step of directing two series of pulses, respectively, into the switching matrix and to an input of the flip-flop, the two series of pulses being substantially in phase with each other.

19. The method of claim 18, wherein the switching matrix comprises at least one input switching submatrix, at least one output switching submatrix, and a plurality of middle switching submatrix.

20. In a method of switching a plurality of input signals to a plurality of output signals, the method including the steps of converting a plurality of parallel input signals into a serial signal, passing said serial signal through a switching matrix, the switching matrix having an output comprising a serial signal, and converting the output of the switching matrix, in a serial-to-parallel converter, into a plurality of parallel output signals, the improvement comprising the steps of periodically rearranging a circuit path extending through the switching matrix, and transferring the output of the switching matrix to the serial-to-parallel converter only while the circuit path extending through the switching matrix is not being rearranged, and isolating the output of the switching matrix from the serial-to-parallel converter while the circuit path extending through the switching matrix is being rearranged.

* * * * *